United States Patent
Matena et al.

(10) Patent No.: US 6,298,390 B1
(45) Date of Patent: Oct. 2, 2001

(54) METHOD AND APPARATUS FOR EXTENDING TRADITIONAL OPERATING SYSTEMS FILE SYSTEMS

(75) Inventors: Vladimir Matena, Redwood City; Yousef A. Khalidi, Sunnyvale, both of CA (US); Jose Bernabeu-Auban, Valencia (ES); Moti N. Thadani, Santa Clara; Kenneth W. Shirriff, Mountain View, both of CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/621,536

(22) Filed: Mar. 26, 1996

Related U.S. Application Data (63) Continuation of application No. 08/562,129, filed on Nov. 22, 1995, now abandoned.

(51) Int. Cl.[7] .................................................... G06F 9/00
(52) U.S. Cl. .......................................... 709/315; 709/319
(58) Field of Search ..................... 395/683; 709/300–305, 709/310–332

(56) References Cited

U.S. PATENT DOCUMENTS

| 5,412,808 | * | 5/1995 | Bauer ................................ | 395/600 |
| 5,463,772 | * | 10/1995 | Thompson et al. .................. | 395/600 |
| 5,689,701 | * | 11/1997 | Ault et al. ............................ | 395/610 |

OTHER PUBLICATIONS

Herdemann et al; "File–System Development with Stackable Layers"; ACM Transactions on Computer Systems, vol. 12, No. 1 pp 58–89, Feb. 1994.*

John Shelby Herdemann, "Stackable Layers: An Architecture for File System Development" Thesis, Master of Science in Computer Science, UCLA pp 1–100, 1991.*

Guy et al; "Implementation of the Focus Replicated File System", USENIX Conference pp 63–71, Jun. 1990.*

Nerdemann et al; "A Layered Approach to File System Development", Technical Report CSD–91007, Mar. 1991.*

Popek et al; Replication in Ficus Distributed File System Proceedings of Workshop help on Management of Replicated Data pp 20–25, Nov. 1990.*

Khalidi et al; "A Flexible External Paging Interface", pp 1–11; Oct. 1993.*

(List continued on next page.)

*Primary Examiner*—Zarni Maung
*Assistant Examiner*—P Caldwell
(74) *Attorney, Agent, or Firm*—Blakely Sokoloff Taylor & Zafman

(57) ABSTRACT

In a computer system having a kernel supporting an interface definition language, a file system composed of an object framework. The object framework includes a set of proxy vnodes, a set of memcache vnodes, and a set of storage vnodes. The set of proxy vnodes and the set of memcache vnodes are linked to the set of storage vnodes through the use of the interface definition language, and the set of proxy vnodes are linked to the set of memcache vnodes through the use of a set of pointers. Each proxy vnode of said set of proxy vnodes is typed so as to differentiate between a set of file system objects such as files, directories and devices. The set of memcache vnodes forms an interface to a virtual memory system while the set of storage vnodes forms an interface to an underlying file system. The file system also uses a set of file paging interfaces that support extensions to the file system while providing full coherence of data.

18 Claims, 8 Drawing Sheets

OTHER PUBLICATIONS

Khalidi et al, "An Implementation of UNIX on an object oriented operating system" pp 1–11; Jan. 1993.*

Jose Rogado, "A Prototype File System for the Cluster OS", pp. 1–12, May 1993.*

David Noveck, "Interposition Mechanism for the OSF/1 AD Version 2 file System", pp. 1–18, Mar. 1994.*

Michael L. Kazar, Bruce W. Leverett, Owen T. Anderson, Vasilis Apostolides, Beth A. Bottos, Sailesh Chutani, Craig F. Everhart, W. Anthony Mason, Shu–Tsui Tu, and Edward R. Zayas, "DEcorum File System Architectural Overview", USENIX Summer Conference, Jun. 11–15, 1990.

Yousef A. Khalidi and Michael N. Nelson, "The Spring Virtual Memory System", Feb., 1993, Sun Microsystems.

Yousef A. Khalidi and Michael N. Nelson, "Extensible File Systems in Spring", Sep., 1993, Sun Microsystems.

S.R. Kleiman, "Vnodes: An Architecture for Multiple File System Types in Sun UNIX", Sun Microsystems.

Michael N. Nelson, Yousef A. Khalidi and Peter W. Madany, "The Spring File System", Feb. 1993, Sun Microsystems.

David S.H. Rosenthal, "Evolving the Vnode Interface", USENIX Summer Conference, Jun. 11–15, 1990.

* cited by examiner

METHOD AND APPARATUS FOR EXTENDING TRADITIONAL OPERATING SYSTEMS FILE SYSTEMS

RELATED APPLICATIONS

This is a continuation of application Ser. No. 08/562,129 filed Nov. 22, 1995 now abandoned.

BACKGROUND OF THE INVENTION

1. Field of the Invention

The present invention relates to the fields of computer operating systems, distributed multi-processing hardware systems, object oriented programming, data caching, file systems, and virtual memory systems. More particularly, the present invention relates to improved techniques for establishing and efficiently extending the functionality of traditional file systems by using a set of dynamically configurable layers.

2. Description of Related Art

Vnode interface as described in "Vnodes: An Architecture for Multiple File System Types in Sun UNIX," by Steve Kleiman, Summer USENIX 1986, June 1986, is an architecture that allows multiple file system types to co-exist within an operating system (OS). Vnode is an abstraction of a file and is used by the OS to access files in file systems of different types without knowing how the file operations are implemented in those different file systems. Over the years, several flaws of the vnode interface have been discovered. These include flaws such as: (1) a single vnode interface represents the interfaces of several different OS objects, such as files, directories, and devices; and (2) a vnode combines file access with file caching.

Traditional operating systems, such as UNIX® (UNIX is a Registered Trademark of AT&T), provide a vnode interface or a vnode-like file system switch that is used to add new file systems to the OS. Such interfaces, however, are complex and cannot be invoked from remote machines. Moreover, the vnode interface is a cumbersome interface—i.e. it provides all the interfaces that a file system may need and a new file system has to implement all of the interfaces regardless of whether the new file system will provide a complete set of functionality.

Figure 1:
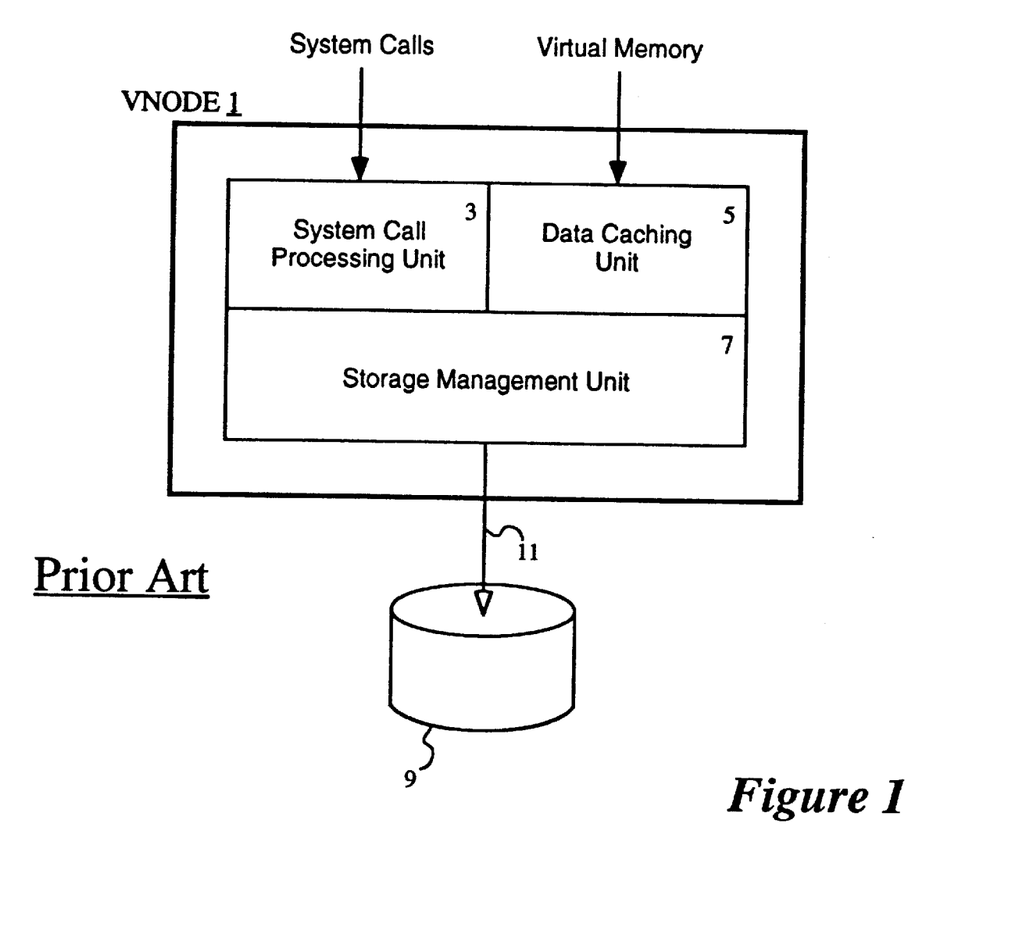
FIG. 1 illustrates a prior art vnode.

FIG. 1 illustrates a prior art vnode 1 with a system call processing unit 3, a data caching unit 5 and a storage management unit 7. Storage management unit 7 interfaces with a storage system 9 through a device driver interface 11.

As described above, one problem with prior art vnode 1 is that it contains an interface that is a "super-set" of several interfaces. Vnode 1 contains functionality for carrying out operation on behalf of system calls, operation call from virtual memory manager to participate in data caching, and functionality to control the storage of data. For example, in Sun Microsystems, Inc., Solaris® 2.4, a vnode would have to implement 42 operations.

Another problem with vnode 1 is that it combines the function of the file access and file caching interfaces. By having these two functions in a single object, it is impossible to implement the occurrences in a distributed system where there are multiple caches for a single file.

In both "Evolving the Vnode Interface," by David S. H. Rosenthal, USENIX 1990, June 1990 (Rosenthal), and "Stacking Vnodes: A Progress Report," by Glenn C. Skinner and Thomas K. Wong, Summer USENIX 1993, June 1993 (Skinner), a description is contained to make the vnode interface more extensible. Both Rosenthal and Skinner describe the creation of a stack of vnodes and utilizing frameworks for managing the stack. However, the protocols described by both Rosenthal and Skinner assume that all vnodes in the stack are in the same address space. Neither Rosenthal nor Skinner considers: (1) composing stacks where some of the vnodes would be located in the kernel and other vnodes located in the user space, or (2) distributing vnodes on multiple computer nodes in a distributed system. It is not clear how the frameworks described by Rosenthal and Skinner would support a coherent distributed file system.

In "Extensible File Systems in Spring," by Yousef A. Khalidi and Michael N. Nelson, SMLI TR-93-18, Sun Microsystems Laboratories, Inc., September 1993 (Khalidi), a flexible framework for extensible file systems is presented which applies to a distributed object oriented operating system. However, the framework provided by Khalidi is incompatible with traditional operating systems such as UNIX and therefore cannot take advantage of existing applications configured for executing in a UNIX environment. Thus, it is considered highly desirable to develop a framework with the same flexibility as in Khalidi which could be applied to traditional operating systems. Such a framework would support inter-operability between the traditional operating systems, such as UNIX, and new operating systems, such as the Spring operating system as described by Khalidi. Thus, it is desirable to enable a vnode-based system to support flexible, extensible file system building that is tailored for a distributed system, without having to re-write or throw away the current investment in the OS code.

SUMMARY

The invention breaks the functionality of a vnode into multiple objects. For compatibility with existing UNIX® (UNIX is a Registered Trademark of AT&T), operating systems(UNIX), the new vnode objects retain some of the characteristics of the prior art vnodes. Implementation of the new objects involve the use of:

(1) an interface definition language (IDL) in the UNIX kernel;

(2) a distributed object framework, including:
  (a) a set of proxy vnodes as an interface to the UNIX system interface, wherein each proxy vnode has a specific type and provides access to either a file, directory, device, or some other object;
  (b) a set of memcache vnodes as an interface with the UNIX virtual memory (VM) system;
  (c) a set of storage vnodes as an interface with the underlying file system, wherein each storage vnode is configured to only handle access to files, directories, devices, and other objects; and, (3) file paging interfaces that support extension to the file system while providing full coherence of data. The paging interfaces are described using the IDL language.

The three-sets of vnodes of a preferred embodiment—i.e., proxy, memcache and storage—are specialized such that each vnode provides specific functionality and together provide more functionality than the prior art vnode.

A preferred embodiment of the invention allows the different vnodes to be:

(1) contained in the same address space—e.g. the address space of a kernel;

(2) contained in separate address spaces—e.g. some vnodes can be contained in the kernel while others are contained in the user space; or (3) distributed over several computing nodes in the network.

Thus, the distribution of the vnodes is transparent to both the system executing the vnode code and the system executing the UNIX code and allowing the distribution of the code and processors required for providing the functionality and the physical file systems that combine to create the logical file system over multiple computing nodes. In addition, a preferred embodiment makes it possible for one or more of the vnodes in a preferred embodiment be implemented as objects in a non-UNIX operating system, thereby allowing coherent sharing of file data among systems with both UNIX and non-UNIX operating systems.

Another benefit of the invention is that it allows a vendor of a traditional operating system to provide the extensibility of a file system required by a distributed file system or file stacking protocol in an evolutionary manner. As mentioned above, the new objects of the preferred embodiment retain some of the characteristics of the prior art vnodes for compatibility with the existing UNIX systems. However, it will be possible in the future to completely eliminate the support for prior vnode interfaces and transition toward a more object oriented operating system, either by evolution or replacement of the generic UNIX code. Thus, the file system interfaces can be gradually evolved in the existing operating system into a more state-of-the-art object oriented approach, such as that taken in Spring.

Other objects, features and advantages of the present invention will be apparent from the accompanying drawings, and from the detailed description that follows below.

DETAILED DESCRIPTION OF THE INVENTION

The present invention provides a method and apparatus for extending traditional operating systems file systems. For purposes of explanation, specific embodiments are set forth to provide a thorough understanding of the present invention. However, it will be understood by one skilled in the art, from reading this disclosure, that the invention may be practiced without these details. Further, although the present invention is described through the use of the UNIX® (UNIX is a Registered Trademark of AT&T), operating system (UNIX), most, if not all, aspects of the invention apply to computer operating systems in general. Moreover, well-known elements, devices, process steps and the like are not set forth in detail in order to avoid obscuring the present invention.

Figure 2:
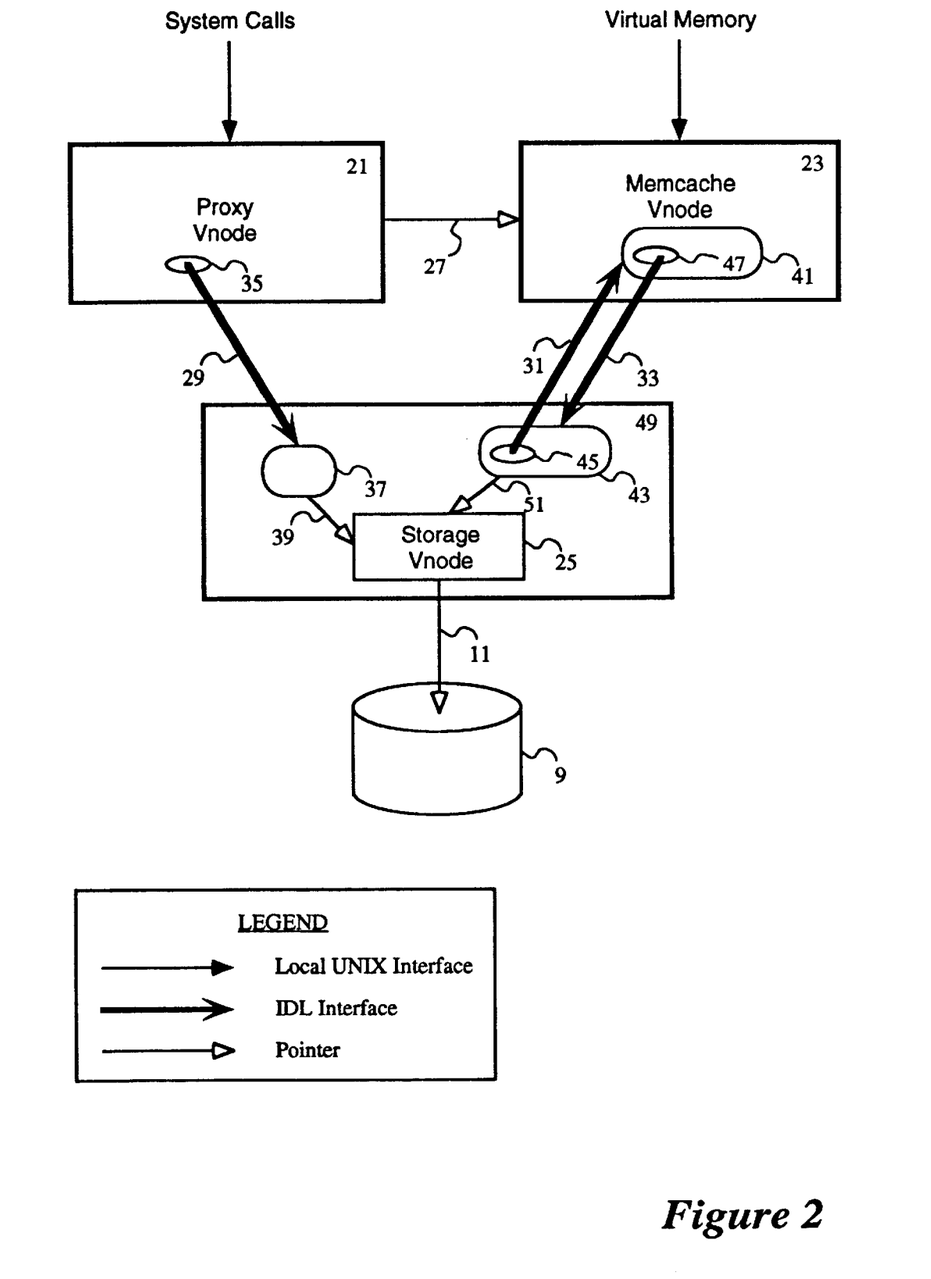
FIG. 2 illustrates a preferred embodiment of the invention wherein the structure of prior art vnode has been divided among a proxy vnode, a memcache vnode, and a storage vnode.

FIG. 2 illustrates a preferred embodiment of the invention wherein the structure of prior art vnode 1 has been divided among a proxy vnode 21, a memcache vnode 23, and a storage interface object 49. Prior art storage system 9 remains unchanged and is accessed through the use of device driver interface 11 by a storage vnode 25 contained in storage interface object 49.

Proxy vnode 21 is connected to memcache vnode 23 through a memcache vnode pointer 27. In addition, proxy vnode 21 contains a first object reference 35 for communicating with a first interface definition language (IDL) interface object 37 contained in storage interface object 49 through the use of a first IDL interface 29. First IDL interface object 37 contains a first storage vnode pointer 39 for accessing storage vnode 25.

Memcache vnode 23 contains a second IDL interface object 41 which itself contains a third object reference 47 for communicating with a third IDL interface object 43 contained in storage interface object 49 through the use of a third IDL interface 33. Third IDL interface object 43 contains a third storage vnode pointer 51 for accessing storage vnode 25 and a second IDL interface object reference 45 for communicating with second IDL interface object 41 through the use of a second IDL interface 31. As will be described in detail below, certain configurations do not require memcache vnode 23, second IDL interface object 41, or third IDL interface object 43.

As illustrated in FIG. 2, proxy vnode 21 receives the many types of UNIX system calls for accessing file systems. Whether or not proxy vnode 21 processes a particular system call depends on how proxy vnode 21 is configured. Proxy vnode 21 can be configured as one of the following three vnode types: raw device, file and directory. Thus, proxy vnode 21 will contain different functionality depending on which one of the three types of vnodes after which proxy vnode 21 is configured. Although the preferred embodiment restricts the discussion to files, directories and devices, other types of vnodes for symbolic links and streams devices are handled similarly.

Similar to proxy vnode 21, storage vnode 25 can be configured to be one of many types of storage vnodes. Each type of storage vnode supports only the operation of the appropriate IDL interface object. The appropriate IDL interface objects supported by each type of storage vnode in a preferred embodiment of the file system of the invention contained in Table 1, below.

TABLE 1

| IDL Interfaces for Storage Vnodes | |
|---|---|
| Storage Vnode Type | IDL Interface Objects Supported |
| raw device | I/O |
| file | file (plus pager if caching is supported) |
| directory | unixdir |

In prior art vnodes, there existed only one storage vnode which implemented code for all possible requests. In a preferred embodiment of the invention, storage vnode 25 is accessed through the use of IDL interface objects and, depending on the configuration of storage vnode 25, storage vnode 25 will only have to implement code for the IDL interface objects storage vnode 25 has to support. For example, if storage vnode 25 is configured as a directory storage vnode, storage vnode 25 has to provide support only for the unixdir IDL interface object and it does not have to implement support for other IDL interface objects, such as file and I/O. In addition, as will be shown below, each storage vnode and its associated IDL interface objects are contained in storage interface object 49.

It is to be noted that there can be multiple instances of each object described in this specification. For example, there can be more than one proxy vnode object containing one or more objects which can be accessed through IDL interfaces. In a preferred embodiment, at least one directory vnode and one file vnode are supported by the file system. Alternatively, a file system implementation can split directory management processes from file management processes. In that alternative case, the directory storage vnodes can reside in one process, usually referred to as a name server, and the file storage vnodes will reside in another process, usually referred to as a block server. The directory storage vnodes in the name server would understand only the unixdir IDL protocol and the file storage vnodes in the block server would understand only the file and pager IDL interfaces.

Figure 3:
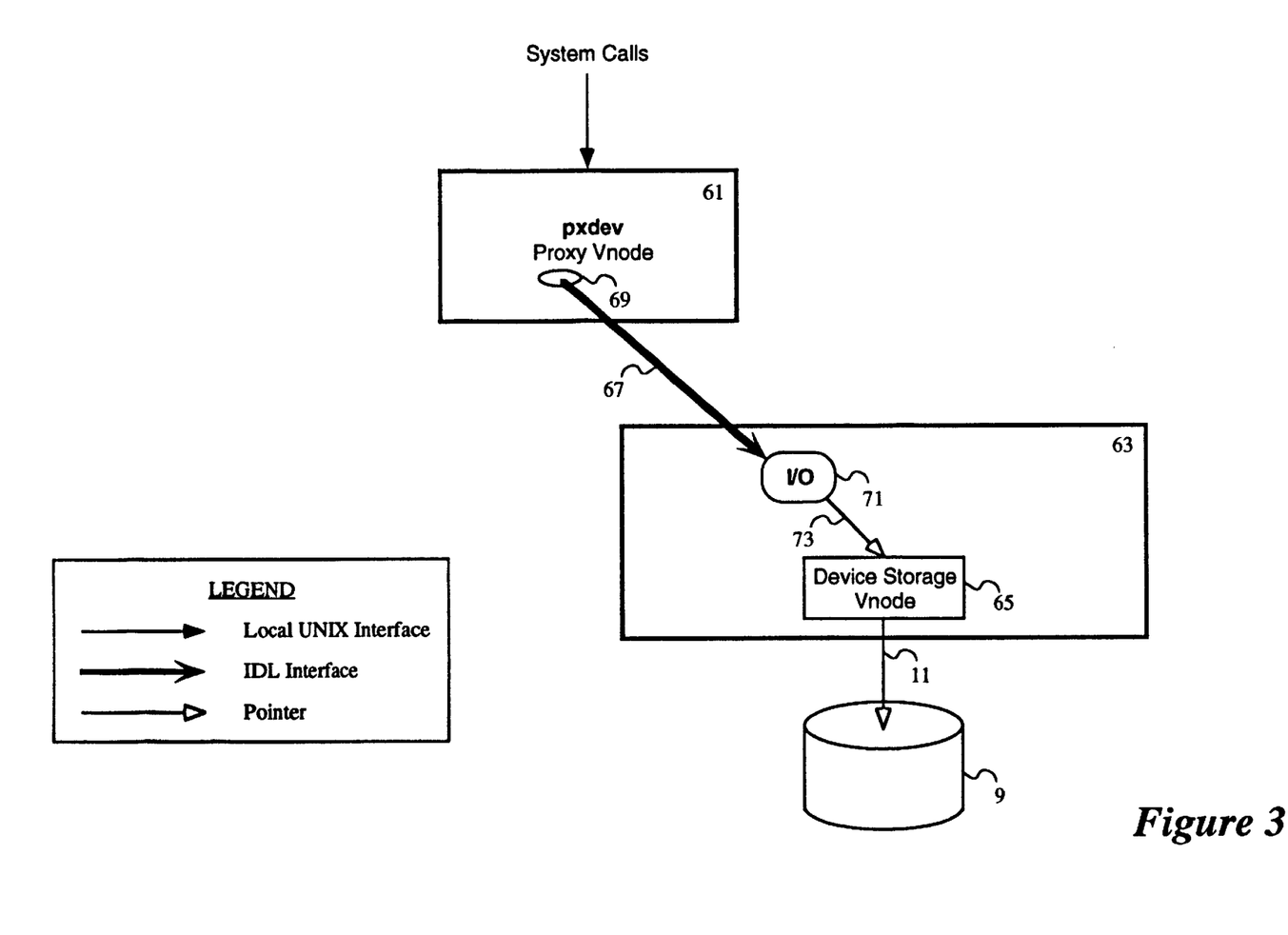
FIG. 3 illustrates a preferred embodiment of the invention wherein an input/output (I/O) proxy vnode, and a device storage vnode are used for accessing I/O devices.

FIG. 3 illustrates a preferred embodiment of the organization of vnodes for input/output (I/O) devices. A pxdev proxy vnode 61 handles the system calls generated by the system call layer. Pxdev proxy vnode 61 contains an I/O object reference 69 for communicating with an I/O object 71 through the use of an I/O IDL interface 67. I/O object 71 is contained in a device interface object 63 and holds a device storage pointer 73 for communicating with a device storage vnode 65. Device storage vnode 65 is configured to perform device access functions to storage system 9 through the use of device driver interface 11.

In the preferred embodiment, pxdev proxy vnode 61 supports two vnode operations which an UNIX system call layer can invoke:

(1) pxdev read: read data into a process' buffer; and
(2) pxdev write: write data from a process' buffer.

In addition, I/O object 71 supports two operations which can be invoked using IDL interface 67:

(1) IDL read: read data; and,
(2) IDL write: write data.

Thus, the two main operations are for a device read and a device write.

In a preferred embodiment of a device read operation, a process initiates a read system call which causes the system call layer to call the pxdev read operation on pxdev proxy vnode 61. Pxdev proxy vnode 61 then invokes the IDL read operation on I/O object 71 of device interface object 63 through the use of I/O IDL interface 67, so that I/O object 71 invokes the vnode read operation on device storage vnode 65 to read the data from storage system 9.

In a preferred embodiment, write operations will execute in a similar manner for a write system call initiated by a process, where the system call layer calls the pxdev write operation on pxdev proxy vnode 61, which then invokes the IDL write operation on I/O object 71 device through the use of I/O IDL interface 67. I/O object 71 invokes the vnode write operation on device storage vnode 65 to write the data to storage system 9.

Through the use of I/O IDL interface 67, the location of device storage vnode 65 and the other objects contained in device interface 63 are transparent to the implementation. Device interface 63 can be in the same address space, in another address space on the same node, or in an address space on another node with respect to pxdev proxy vnode 61. It is to be noted that there are only two vnodes involved because there is no caching of device data in UNIX. Alternatively, if caching of device data is desired, the I/O object can contain a file interface object.

Figure 4:
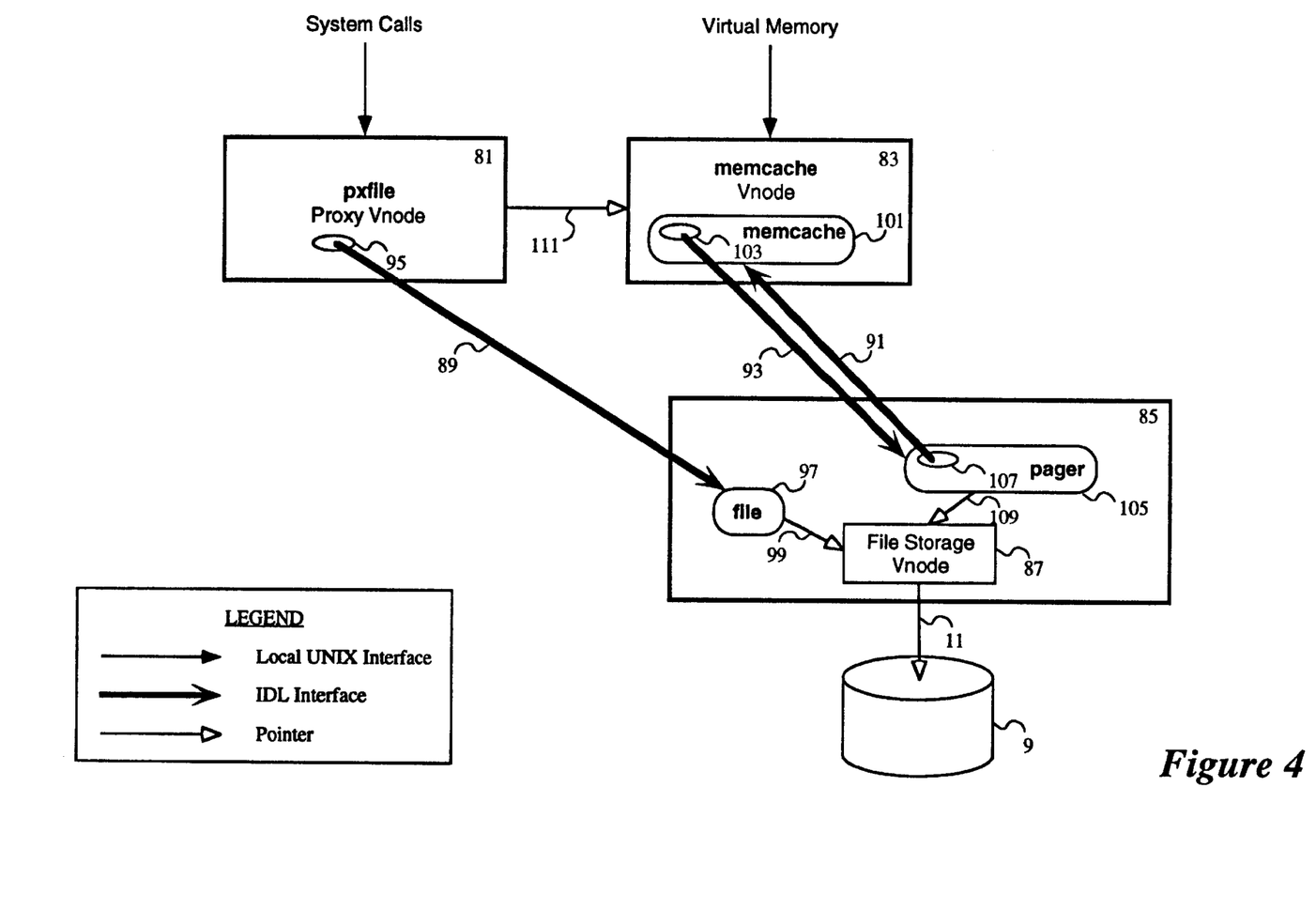
FIG. 4 illustrates a preferred embodiment of the invention wherein a pxfile proxy vnode, a memcache vnode, and a file storage vnode are used for providing file access.

FIG. 4 illustrates a preferred embodiment of the invention for accessing a file on storage system 9, including a pxfile proxy vnode 81, a memcache vnode 83, and a file interface object 85 containing a file storage vnode 87. Pxfile proxy vnode 81 is connected with memcache vnode 83 through the use of a memcache vnode pointer 111. Pxfile proxy vnode 81 and memcache vnode 83 are both coupled to the objects inside a file interface object 85 as described below.

Pxfile proxy vnode 81 is a proxy vnode configured for file access and is called from the UNIX kernel during the execution of system calls that access files. Pxfile proxy vnode 81 contains a file object reference 95 for communicating with a file object 97—representing a file and contained in file interface object 85—through the use of a file IDL interface 89. File object 97 contains a file storage vnode pointer 99 for accessing file storage vnode 87.

Memcache vnode 83 is a vnode configured for caching file pages and contains a memcache object 101. Memcache object 101 contains a pager object reference 103 for communicating with a pager 105, contained in file interface object 85, through the use of a pager IDL interface 93. Reciprocally, pager 105 contains a memcache object reference 107 for communicating with memcache object 101 through the use of a memcache IDL interface 91. Pager 105 also contains a file storage vnode 109 for accessing file storage vnode 87.

The operations provided by pxfile proxy vnode 81 which a UNIX system call layer can invoke are:

(1) read: read data to a process' buffer;
(2) write: write data from process' buffer; and,
(3) mmap: map file into a process' address space.

In addition, memcache vnode 83 provides the following operations, which can be invoked from a virtual memory system:

(1) addmap: add a mapping to the memcache;
(2) delmap: delete a mapping to the memcache;
(3) getpage: return file pages from the memcache; and,
(4) putpage: controls writing pages to the storage system and moving pages to freelist.

As described above, file interface object 85 provides a container for several objects that support file access to storage system 9. File object 97 inherits its interface from I/O object 71 and has the following operations which can be invoked through the use of file IDL interface 89:

(1) IDL read: inherited from the I/O object;
(2) IDL write: inherited from the I/O object; and,
(3) IDL bind: bind a file to a memcache object.

The bind operation is issued by pxfile proxy vnode 81 when pxfile proxy vnode 81 decides to cache file data in a local cache. The bind operation is described in "The Spring Virtual Memory System," by Yousef A. Khalidi and Michael N. Nelson, SMLI TR-93-09, Sun Microsystems Laboratories, Inc., February 1993 (Khalidi A) and results in the creation of pager object 105 and memcache object 101. Pager object 105 and memcache object 101 are used to implement a cache coherency protocol, as described below. Note that if pxfile proxy vnode 81 decides that the file should not be cached, it will not issue the bind operation and pxfile proxy vnode 81 can still read and write file data using the IDL read and IDL write operations inherited from I/O object 71. However, an uncached file cannot be mapped into the memory of a process.

Pager object 105, which is also contained in file interface object 85, supports the following operations which can be accessed through the use of pager IDL interface 93:

(1) page_in: request pages from the pager with an argument being used to tell the pager the intended access rights—i.e. read-only or read-write;

(2) page_upgrade: upgrade access rights of existing pages from read-only to read-write;

(3) page_zero: advise the pager that pages will be created with read-write access;

(4) page_out: write modified pages to the storage system; the cache will discard the pages;

(5) write_out: write modified pages to the storage system; the cache will downgrade access rights to read-only; and, (6) sync: write modified pages to the storage system; the cache retains read-write access to the page.

Note that each request may specify more than one page. The pages are specified by the offset and length arguments.

Memcache object 101 supports the following operations which can be accessed through the use of memcache IDL interface 91:

(1) flush_back: request that the cache give up all access rights to pages;

(2) deny_writes: request that the cache down-grades access rights to read-only;

(3) write_back: request that the cache sends modified pages to the storage system; and, (4) delete_range: request that the cache discards pages.

The cache must send any modified pages to storage system 9 if it receives a flush_back, deny_writes, or write_back request. However, the cache does not send pages to storage system 9 if it receives the delete_range request.

In a preferred embodiment of a file read operation, a process issues a read system call which causes the system call layer to invoke the read operation on pxfile proxy vnode 81. If the file is cached, pxfile proxy vnode 81 invokes the cache_read function on memcache vnode 83. The cache_read operation maps the requested portion of the file into kernel memory using a segmap driver. The protocol for memory mapping will be explained further, below. Cache_read then simply copies the data from the kernel memory mapped area into the process' buffer. If the file data does not reside in the local memory cache, the page-fault mechanism, further described below, will be invoked to bring the data from file storage vnode 87 using pager 105 into the local cache. Also, once the data is in the cache, it is under the control of the local virtual memory system and the local virtual memory system will implement the various page replacement policies that are well known in the art.

A preferred embodiment of the file write system call proceeds similarly to the file read system call with the following differences. The data is copied from the process' buffer to the kernel memory mapped area. At the end of cache_write, if the file access is synchronous, the data is sent to file storage vnode 87 through pager 105 to be stored by storage system 9. The written data remains cached in memcache object 101.

A preferred embodiment of the invention also supports the mapping of parts or all of a file into an address space. This is used by a kernel to map file pages into a kernel address during execution of read and write system calls, or to establish a mapping of the file into a process' address space. A process initiates mapping by issuing a mmap system call to the system call layer, with the arguments for the system call specifying the range of the file to be mapped and the access rights—i.e. read-only or read-write—to be assigned to the file. The system call layer dispatches the request to the pxfile proxy vnode 81 through the mmap vnode operation. If the memcache object for this file does not yet exist, pxfile proxy vnode 81 creates a new memcache object through the use of the bind operation of file object 97, accessed by file IDL interface 89, as described earlier. Then, pxfile proxy vnode 81 calls UNIX virtual memory to create a seg_vn segment driver, passing it memcache vnode 83 as the vnode to be used for caching the file. After virtual memory creates the seg_vn driver, it calls the addmap vnode operation on memcache vnode 83 to inform memcache object 101 that a mapping is being added.

Subsequent virtual memory operations—i.e., getpage and putpage—will use memcache vnode 83. It is to be noted that the virtual memory is not aware of the existence of pxfile proxy vnode 81.

During the read and write operations, a memory mapping of the file is established. There is no mmap system call—the mapping is done internally by the kernel during processing of the read and write system calls. In this case, a seg_map driver is used instead of the seg_vn driver. When a requested file page is not present in memcache vnode 83, the page fault protocol is invoked as the processor's memory management unit will detect a page fault when trying to access the memory mapped data. The fault is processed by the virtual memory subsystem of the UNIX kernel and the virtual memory subsystem dispatches control to the appropriate segment driver for the faulted address. In a preferred embodiment of the invention, the seg_vn or seg_map driver is invoked. The segment driver locates the vnode responsible for managing file pages—in a preferred embodiment, memcache vnode 83—and calls the getpage vnode operation. Getpage causes memcache vnode 83 to first try to locate the page in the local cache. If the page is found with the appropriate access rights, the page is returned to the segment driver that maps the page into the memory management unit.

When a page is not found locally, the page_in method on pager object 105 is invoked using pager object reference 103. Thus, in a preferred embodiment of the current invention, the call is processed by pager object 105. Pager object 105 calls file storage vnode 87 to retrieve the data from storage system 9 through the use of device driver interface 11. Note that if there are other pager objects for file storage vnode 87, the other pages are accessed to enforce the cache coherence protocol that will be described later. Access of other pagers done internally in file interface object 85, transparently to memcache 83.

If the page is found locally, but the page does not have sufficient access rights—i.e., the page is read-only and the requested access is read-write), the pager operation page_upgrade is called to advise pager object 105 that the page is cached read-write from now on.

Figure 5:
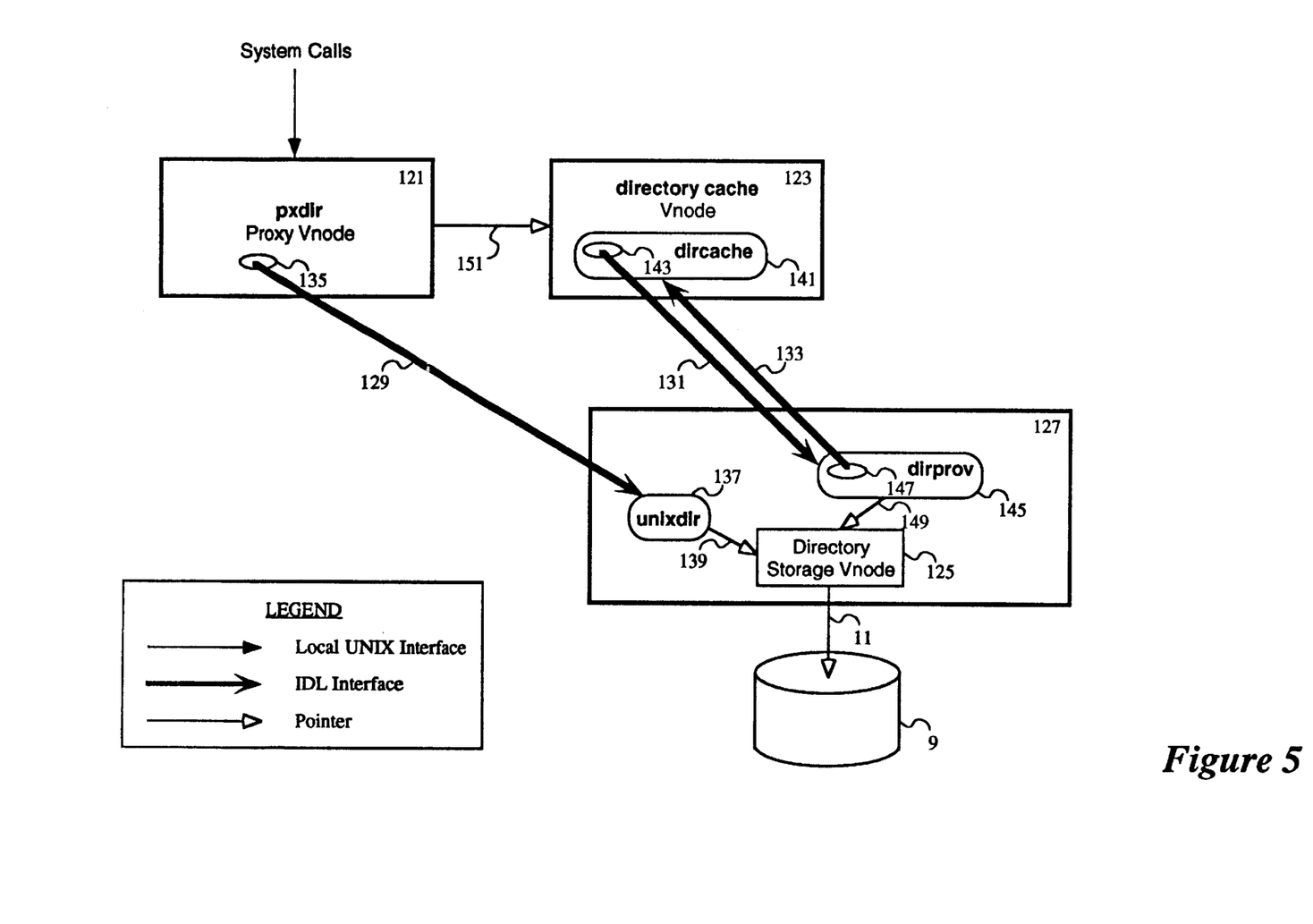
FIG. 5 illustrates a preferred embodiment of the invention wherein a pxdir proxy vnode, a directory cache vnode, and a directory storage vnode are used to provide directory access.

FIG. 5 illustrates a preferred embodiment of the invention wherein a pxdir proxy vnode 121, a directory cache vnode 123, and a directory storage object vnode 125 contained in a directory interface object 127 are used to provide directory access functions for storage system 9. Pxdir proxy vnode 121 is connected to directory cache vnode 123 through the use of a directory cache vnode pointer 151. Pxdir proxy vnode 121 and directory cache vnode 123 are both coupled to the objects inside a directory interface object 127 as described below.

As shown in FIG. 5, pxdir proxy vnode 121 contains an unixdir object reference 135 for accessing an unixdir object 137 contained in directory interface object 127 through the use of an unixdir IDL interface 129. Directory interface object 127 also contains a dirprov object 145, accessible by an dirprov object reference 143 contained in a dircache object 141 through the use of a dirprov IDL interface 131. Dircache object 141 is reciprocally accessible by dirprov object 145 through the use of a dircache object reference 147 contained in dirprov object 145.

Although pxdir proxy vnode 121 and unixdir object 137 are sufficient to support directory access, in a preferred embodiment it is desirable that the results of directory lookup and readdir operations are cached. The caching is achieved through the use of directory cache and directory provider objects. In FIG. 5, a directory cache object is dircache object 141 and a directory provide object is dirprov object 145. It is to be noted that, in an alternative embodiment, directory cache vnode 123 can be eliminated and directory caching can be supported through the sole use of dircache object 141.

Continuing to FIG. 5, pxdir proxy vnode 121 is accessed using system calls from a system call layer of UNIX. The key operations supported by pxdir proxy vnode 121 are:

(1) lookup: lookup a name in the directory;

(2) readdir: read the directory content;

(3) create: create a file in the directory;

(4) remove: remove a file from the directory;

(5) mkdir: create a subdirectory; and, (6) rmdir: remove a subdirectory.

Unixdir object 137 provides directory access and supports the following operations accessible through the use of unixdir IDL interface 129:

(1) lookup: perform lookup in the directory;

(2) readdir: read directory content;

(3) create_file: create a file;

(4) remove_file: remove a file;

(5) create_dir: create subdirectory;

(6) remove_dir: remove subdirectory; and, (7) bind_dir: bind directory to a directory cache—i.e., dircache object 141.

The operations supported by dirprov object 145 and accessible through the use of dirprov IDL interface 131 are almost identical to the unixdir interface but take additional arguments not shown here:

(1) lookup: perform lookup in the directory;

(2) readdir: read directory content;

(3) create_file: create a file;

(4) remove_file: remove a file;

(5) create_dir: create subdirectory; and, (6) remove_dir: remove subdirectory.

Dircache object 141 is called by dirprov object 145—using both dircache object reference 147 and dircache IDL interface 133—to enforce cache coherence. The operations supported by dircache object 141 and accessible through the use of dircache IDL interface 133 are:

(1) inval_entry: invalidate a single entry in the cache;

(2) inval_rddir: invalidate any data cached from previous readdir operations; and, (3) inval_all: invalidate everything in the cache.

The cache coherence protocol works similarly to that described for file caching.

Figure 6:
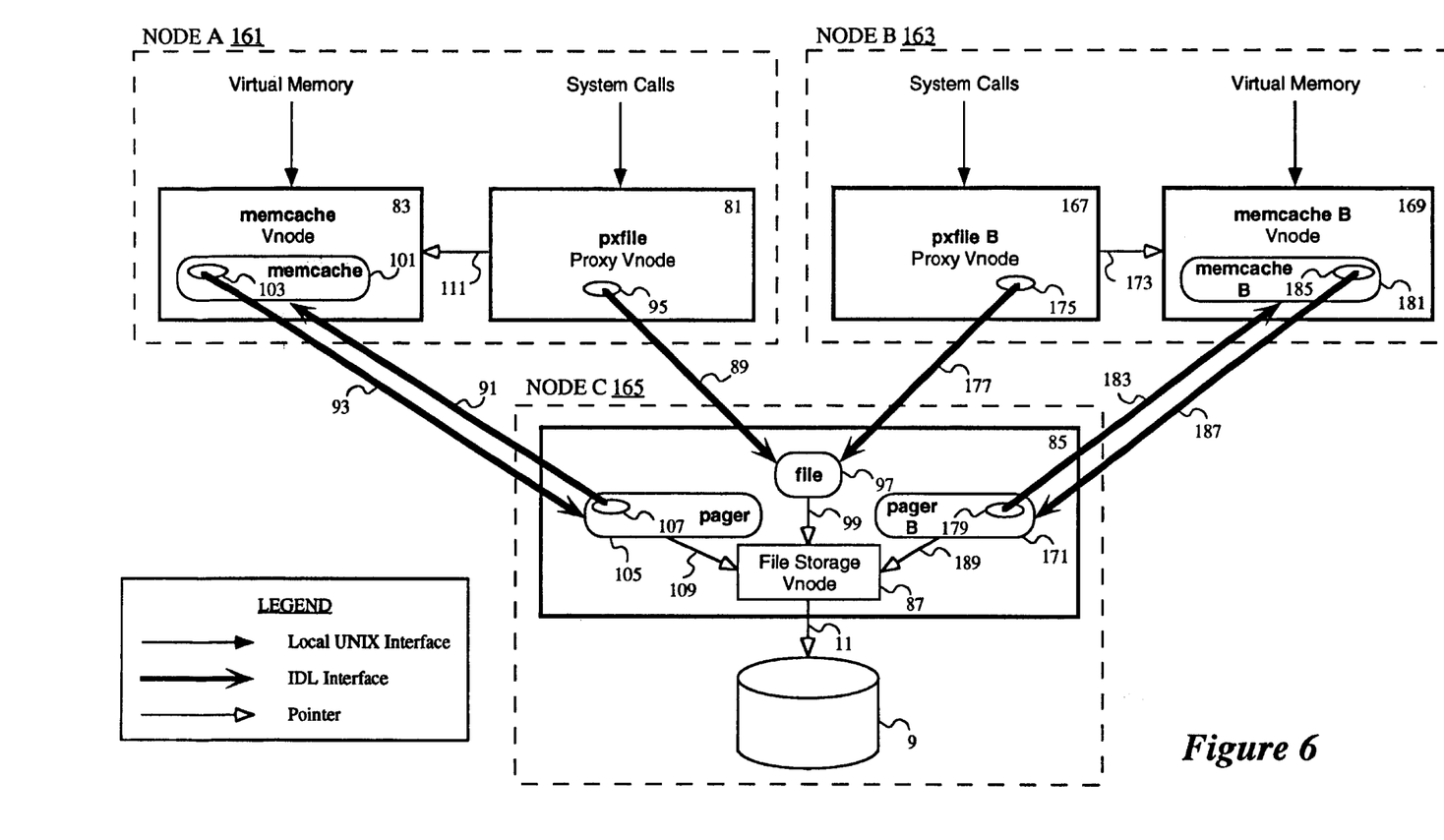
FIG. 6 illustrates a preferred embodiment of the invention wherein vnodes and IDL interfaces are used to construct a file system which is distributed over three computer nodes.

FIG. 6 illustrates a preferred embodiment of the invention wherein vnodes and IDL interfaces are used to construct a file system which is distributed over three nodes—i.e., computers—a node A 161, a node B 163, and a node C 165. The objects which have already been referenced in describing FIG. 4—e.g., pxfile proxy vnode 81, memcache vnode 83, and file interface object 85—provide the same functionality as previously described except now they are distributed as described below. In addition, new instances of objects are also created, as described below, to provide a complete example.

In a preferred embodiment of the invention for implementing a distributed file system (DFS), file storage vnode 87 is now contained in the kernel of node C 165, which is the computer node that is responsible for storing the data. Node A 161 and node B 163 both access the file represented by file object 97 and both cache file data by creating instances of pxfile proxy vnodes and memcache vnodes using the protocol as described above. Note that if node C 165 intends to cache file data, it must also create its own set of pxfile proxy and memcache vnodes as the local and remote file operations are treated identically.

Continuing to refer to FIG. 6, node B 163 has created a pxfile B proxy vnode 167 and a memcache B vnode 169. Pxfile B proxy vnode 167 is connected with memcache B vnode 169 through the use of a memcache B vnode pointer 173. Pxfile B proxy vnode 167 contains a file object reference 175 which accesses file object 97 in node C 165 through the use of a file IDL interface 177. In addition, there has also been created a pager B object 171 in file interface 85 of node C 165 to handle page operations from node B 163. Pager B object 171 contains a memcache B object reference 179 for accessing a memcache B object 181 contained in memcache B vnode 169 through the use of a memcache B IDL interface 183. Reciprocally, memcache B object 181 contains a pager B object reference 185 for accessing pager B object 171 through the use of a pager B IDL interface 187. Pager B object 171 also contains a file storage vnode pointer 189, used for accessing file storage vnode 87.

It is to be noted that pager B object 171 and the objects contained in node B 163 function in an identical manner to pager object 105 and the objects contained in node A 161, respectively. For example, pxfile B proxy vnode 167 provides the same functions described above as pxfile proxy vnode 81. Moreover, the IDL interfaces interconnecting node A 161 and node B 163 to node C 165 operate as described above and provide an interface between the objects located on the different nodes transparent to the location of the objects.

The file access operations—i.e., read, write, and memory mapped access—proceed as described above. For example, when memcache object 101 calls pager object 105 to: (1) send the requested page through the calling of the page_in operation over pager IDL interface 93; or (2) upgrade page access rights from read-only to read-write through the calling of the page_upgrade operation over pager IDL interface 93; pager object 105 must perform the actions described below before sending a reply to memcache object 101 in order to enforce data coherency:

(1) if memcache object 101 requires a read-only access to a file page, pager object 105 must make sure that no other cache has the page in the read-write mode; and, (2) if memcache object 101 requires a read-write access to a file page, pager object 105 must make sure that the page is not present in another cache. File access operations from node B 163 operate in an identical manner to the example given and the above description can be applied to node B 163 by replacing objects of node A 161 and node C 165 used in the example with the appropriate objects in node B 163 and node C 165.

Note that the file can still be accessed through file interface object 85 using the read and write operations while maintaining data coherence. If an IDL read operation is received by file object 97, file object 97 has to make sure that no cache has the requested data in the read-write mode. If an IDL write operation is received, the implementation has to make sure that no cache caches the pages that overlap the to-be-written data before the write operation is performed.

In order to enforce cache coherence, each pager object—i.e. pager object 105 and pager B object 171—maintains information describing which pages the associated cache possesses and which mode, read-only or read-write, the pages are assigned. In this way, the file interface object has a complete knowledge of where the file pages are cached and can enforce the coherence conditions described above.

As an example of cache coherence, consider the following scenario. A process on node B 163 has written data into a file page. The page is cached on node B 163 and the data on storage system 9 on node C 165 is out-of-date. Now a process on node A 161 wants to read the data in the page. The page is not present in memcache object 101 on node A 161 and the page fault mechanism will end up calling the page__in operation on pager object 107. Pager object 107 checks with all other pagers to make sure that no other cache caches the page in a conflicting mode. Pager object 107 finds that pager B object 171 is caching the page in read-write mode, which is in conflict with the read-only mode requested by memcache 101. Therefore, pager object 107 invokes the deny__writes operation on memcache B object 181. Memcache B object 181 writes the page to pager B object 171—which will cause pager B object 171 to write the page to storage vnode 87—using the write__out operation and down-grades its caching rights to read-only. Now pager B object 171 will indicate that memcache B object 181 has only read-only rights to the page, which doesn't conflict with the read-only access requested by memcache object 101. The page__in operation from memcache object 101 can now proceed and read the up-to-date copy of the page from storage vnode 87. The page is returned to memcache object 101 and the read operation from the process on node A 161 will complete.

Figure 7:
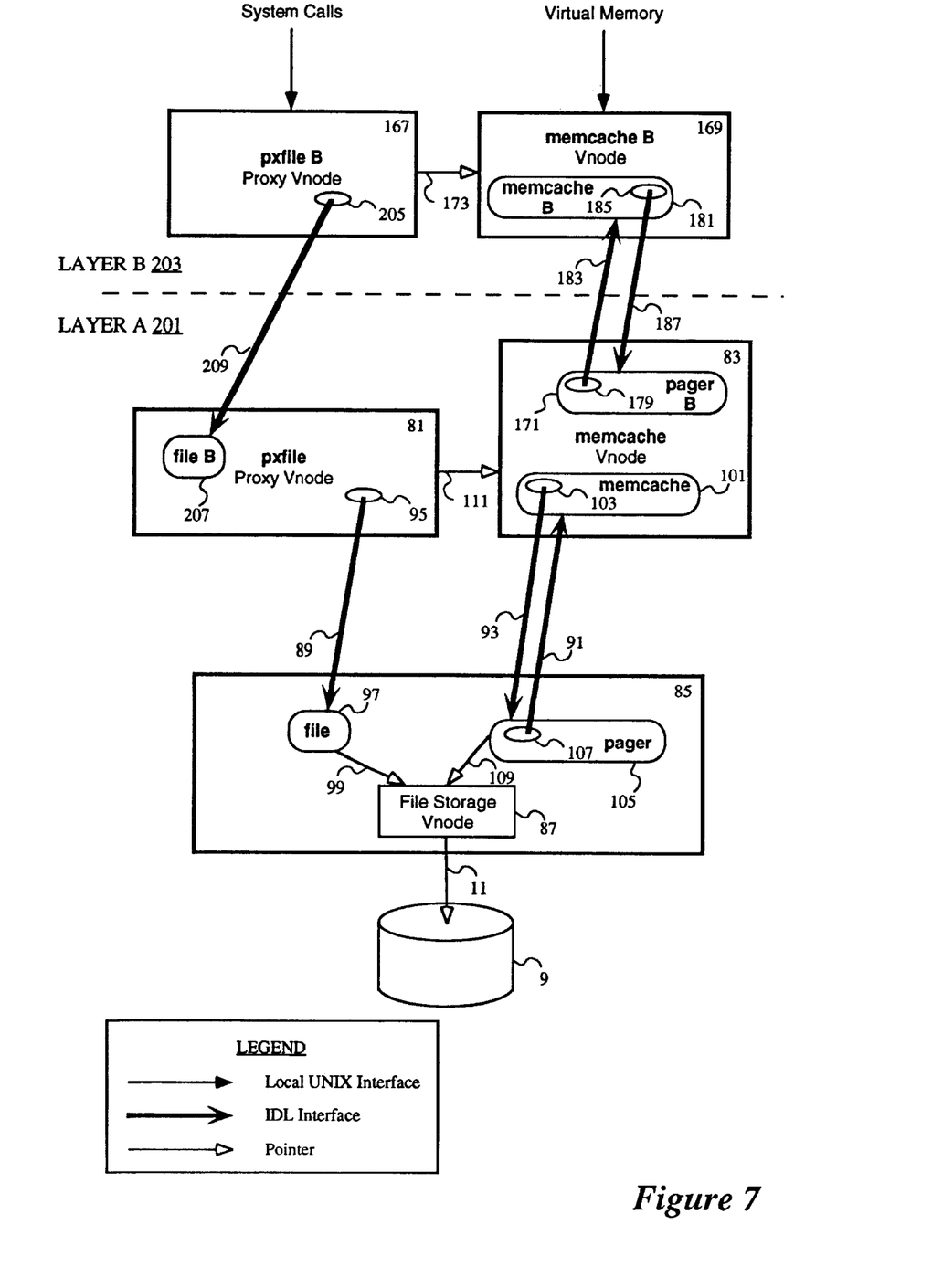
FIG. 7 illustrates a preferred embodiment of the invention wherein the vnodes and IDL interfaces are used to extend the functionality of a file system to provide for compression by stacking.

FIG. 7 illustrates a preferred embodiment of the invention wherein the vnodes and IDL interfaces are used to extend the functionality of a file system to provide for compression by stacking.

A layer A 201 is an existing file system, such as an UNIX file system (UFS), with protocols among pxfile proxy vnode 81, memcache vnode 83, and file interface object 85 are as described in FIG. 4. In a preferred embodiment of the invention, a layer B 203 is created on top of layer A 201 is responsible for compressing file data. A process that opens a file at layer B 203 would read data that is automatically uncompressed by layer B 203. Similarly, if a process writes data, layer B 203 automatically compresses the data before it is written to layer A 201. The compression/decompression provided by layer B 203 is accomplished without modifying the code in layer A 201 or in file storage vnode 87.

In a preferred embodiment of the invention, pxfile B proxy vnode 167 is created and the bind operation is invoked on a file B object 207 through the use of a file B object reference 205 and a file B IDL interface 209. The bind protocol creates pager B object 171 and memcache B object 181 to enforce data coherence between layer A 201 and layer B 203. For example, in an online file backup system where a process in layer B 203—a normal application—writes uncompressed file data using pxfile B proxy vnode 167 and a process in layer A 201—an application for backing-up data in storage system 9—reads compressed data using pxfile proxy vnode 81.

It is important that the process in layer A 201 reads the most recent file data written by the process in layer B 203 rather than the out-dated file data from storage vnode 9. Thus, when the process in layer A 201 reads data from memcache object 101, memcache object 101 must ensure that the higher layer—i.e., layer B 203—does not cache data in a conflicting mode. In this case, if layer A 201 needs access to the file pages while the pages are cached in layer B 203 in read-write mode, pager B object 171 sends the deny__writes request to memcache B object 181. Memcache B object 181 writes the modified pages to pager B object 171 and downgrades the access rights of the modified pages to read-only. Now layer A 201 has up-to-date versions of the file pages and can return them to the process in layer A 201.

The cache coherence protocol works similarly if data is written at layer A 201 and concurrently read at layer B 203. In alternative embodiments, layer A 201 and layer B 203 can be in the same address space, in two separate address spaces on the same node, or distributed on different nodes in the network. Also, the protocols for a DFS and for file stacking uses the same IDL interfaces and therefore allows combining DFS with file stacking.

Figure 8:
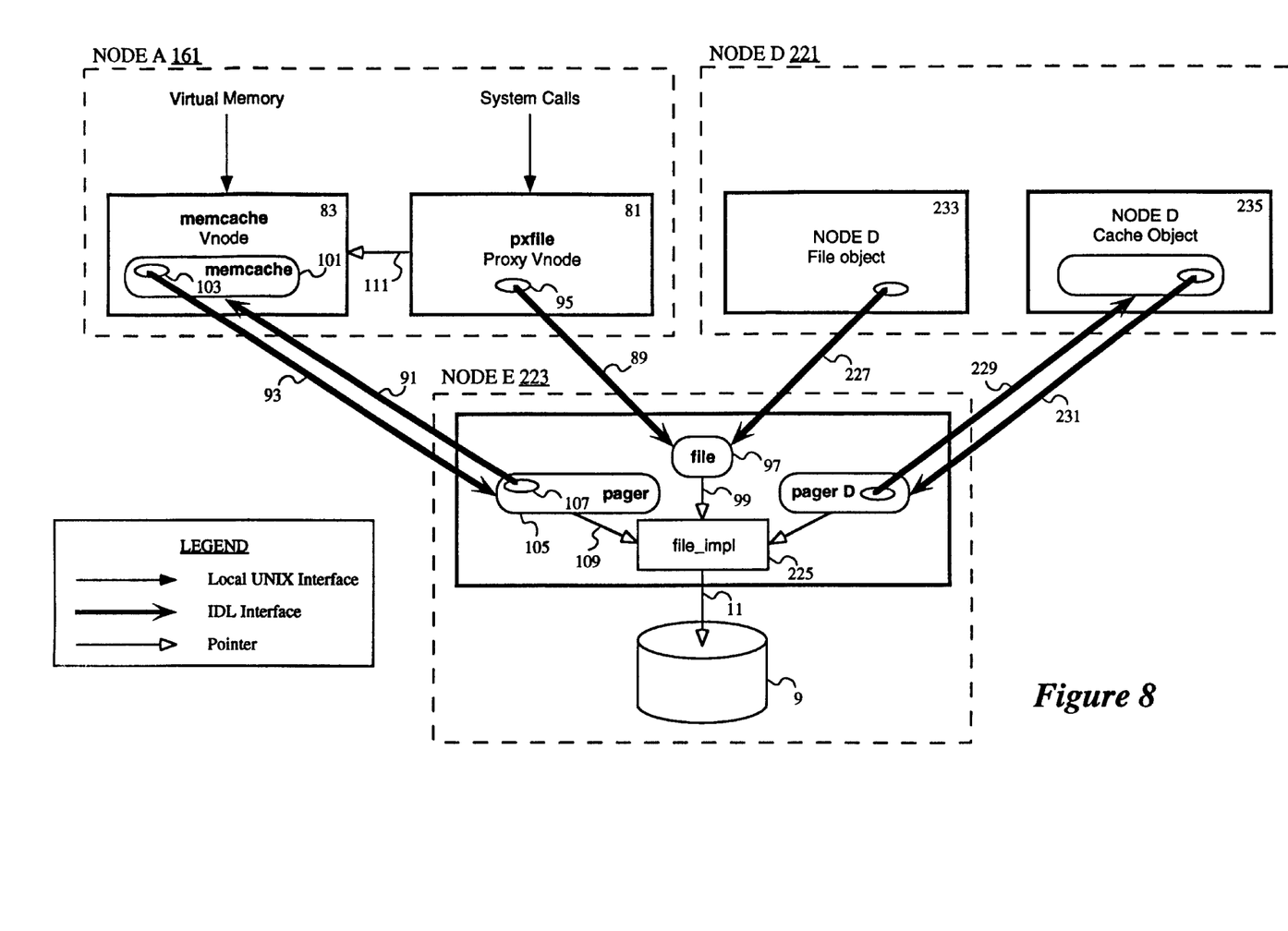
FIG. 8 illustrates a preferred embodiment of the invention supporting file system inter-operability between UNIX and other operating systems.

FIG. 8 illustrates a preferred embodiment of the invention supporting file system inter-operability between UNIX and two other operating systems in a DFS. The file is stored on node E 223 running an object oriented operating system such as the Spring operating system. Spring implements the file IDL interface, the pager IDL interface and related objects for supporting file IDL interface 89 and pager IDL interface 93, but Spring does not use the concept of a storage vnode to implement the file. Instead, it uses a file__impl object 225 to implement the layout of the file on storage system 9.

Node A 161 runs the UNIX operating system and uses the various embodiments of the vnodes of the invention as described above. Node D 221 runs an unspecified operating system XYZ, which implements the file access operations accessed by IDL interfaces 227, 229 and 231 using implementation methods with which neither node A 161 nor node E 223 needs to be concerned. As long as node A 161, node D 221 and node E 223 adhere to the IDL interfaces and observe the cache coherence protocols defined by the IDL interfaces, file accesses from node A 161 and node D 221 will operate with the coherence of data being maintained. In an alternative embodiment, file stacking can be done across a network of nodes with heterogeneous operating systems using the IDL interfaces as provided above.

As described above, use of the IDL interfaces allows the support of coherent sharing of files between traditional operating systems, such as UNIX, and new operating systems, such as those which are object oriented. In addition, the IDL interfaces support: the sharing of files among heterogeneous operating systems; the evolution of file system interfaces by inheritance so the same file system can support multiple revisions of the file interface; and, distribution of the parts of the system transparent to the file system developer.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. In a computer system having a kernel supporting an interface definition language, a file system comprising:
   an object framework, said object framework including:
   a set of proxy vnodes;
   a set of memcache vnodes; and,
   a set of storage vnodes;
wherein both said set of proxy vnodes and said set of memcache vnodes are coupled for communication with said set of storage vnodes through the use of said interface definition language, and said set of proxy vnodes are coupled for communication with said set of memcache vnodes through the use of a set of pointers.

2. The file system of claim 1, wherein each proxy vnode of said set of proxy vnodes is typed so as to differentiate between a set of file system objects.

3. The file system of claim 2, wherein said set of file system objects include files, directories and devices.

4. The file system of claim 1, wherein said set of memcache vnodes forms an interface to a virtual memory system.

5. The file system of claim 1, wherein said set of storage vnodes forms an interface to an underlying file system.

6. The file system of claim 1, further comprising a set of file paging interfaces that support extensions to said file system while providing full coherence of data.

7. The file system of claim 1, wherein said interface definition language supports coherent sharing of files between said kernel and object oriented operating systems.

8. The file system of claim 1, wherein said interface definition language supports sharing of files among heterogeneous operating systems.

9. The file system of claim 1, wherein said interface definition language supports evolution of an interface of said file system by inheritance such that said file system can support multiple revisions of said file interface.

10. The file system of claim 1, wherein said file system is implemented in a user process of said computer system.

11. The file system of claim 1, wherein said interface definition language supports distribution of parts of said file system transparent to a file system developer.

12. The file system of claim 1, wherein said computer system is a distributed computer system with a plurality of computers.

13. The file system of claim 1, wherein each proxy vnode of said set of proxy vnodes; each memcache vnode of said set of memcache vnodes; and each storage vnode of said set of storage vnodes is selectively located in a first address space; a second address space; and a third address space.

14. The file system of claim 1, wherein said file system is split into:

a first layer having a first proxy vnode of said set of proxy vnodes, a first memcache vnode of said set of memcache vnodes, and a first storage vnode of said set of storage vnodes; and, a second layer having a second proxy vnode of said set of proxy vnodes, and a second memcache vnode of said set of memcache vnodes.

15. The file system of claim 14, wherein said first layer is configured for compressing of any file data received from said second layer and decompression of any file data sent to said first layer.

16. The file system of claim 14, wherein said first layer coherently caches file data and acts as a pager for supplying file data to said second layer.

17. The file system of claim 14, wherein said second layer coherently caches file data from said first layer and acts as a pager for supplying file data to a third layer.

18. A method for defining a file system for a computer system having a kernel supporting an interface definition language, comprising the steps of:

defining an object framework including a set a proxy vnodes, a set of memcache vnodes, and a set of storage vnodes;

linking both said set of proxy vnodes and said set of memcache vnodes to said set of storage vnodes through the use of said interface definition language; and, linking said set of proxy vnodes to said set of memcache vnodes through the use of a set of pointers.

* * * * *